(12) United States Patent
Ajisaka

(10) Patent No.: US 11,052,786 B2
(45) Date of Patent: Jul. 6, 2021

(54) VEHICLE

(71) Applicant: TOYOTA JIDOSHA KABUSHIKI KAISHA, Toyota (JP)

(72) Inventor: Satoshi Ajisaka, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 272 days.

(21) Appl. No.: 15/725,166

(22) Filed: Oct. 4, 2017

(65) Prior Publication Data

US 2018/0134180 A1 May 17, 2018

(30) Foreign Application Priority Data

Nov. 15, 2016 (JP) ................. JP2016-222674

(51) Int. Cl.
*B60N 2/02* (2006.01)
*B60N 2/04* (2006.01)
(Continued)

(52) U.S. Cl.
CPC .............. *B60N 2/0224* (2013.01); *B60J 5/06* (2013.01); *B60N 2/04* (2013.01); *B60N 2/06* (2013.01); *B60N 2/062* (2013.01); *B60N 2/14* (2013.01); *E05F 15/60* (2015.01); *G05B 15/02* (2013.01); *B60N 2002/0256* (2013.01);
(Continued)

(58) Field of Classification Search
CPC .......... B60N 2/0224; B60N 2/04; B60N 2/06; B60N 2/062; B60N 2/14; B60N 2002/0256; E05F 15/76
See application file for complete search history.

(56) References Cited

U.S. PATENT DOCUMENTS 6,583,715 B1 6/2003 Benzie et al.
6,991,060 B2 1/2006 Chernoff et al.
(Continued)

FOREIGN PATENT DOCUMENTS

DE 10108763 A1 9/2001
DE 102007062576 A1 6/2009
(Continued)

OTHER PUBLICATIONS

"Mia (PKW-Modell)." <URL:https://de.wikipedia.org/w/index.php?title=Mia_(PKW-Modell)&oldid=159335504.>, Retrieved Jun. 21, 2018.
(Continued)

*Primary Examiner* — Charles J Han
(74) *Attorney, Agent, or Firm* — Oliff PLC

(57) ABSTRACT

A vehicle includes: a driving seat; a pair of doors; a seat moving mechanism configured to move the driving seat between a driving state and a receiving state, the driving seat in the driving state being positioned at a vehicle width direction center and facing a vehicle front, and the receiving state satisfying at least one condition of: the driving seat being positioned closer to one door of the pair of doors than in the driving state or the driving seat facing further toward the one door than in the driving state; a detection unit configured to detect a portable device in a detection area in a vicinity of the vehicle and outside a passenger compartment; and a seat control unit that controls the seat moving mechanism so as to move the driving seat into the receiving state.

5 Claims, 4 Drawing Sheets

(51) Int. Cl.
  *E05F 15/60* (2015.01)
  *G05B 15/02* (2006.01)
  *B60J 5/06* (2006.01)
  *B60N 2/06* (2006.01)
  *B60N 2/14* (2006.01)
  *E05F 15/76* (2015.01)
  *E05F 15/632* (2015.01)

(52) U.S. Cl.
  CPC ............ *E05F 15/632* (2015.01); *E05F 15/76* (2015.01); *E05Y 2900/531* (2013.01)

(56) References Cited

U.S. PATENT DOCUMENTS

| | | | | |
|---|---|---|---|---|
| 2010/0250072 | A1* | 9/2010 | Shimoda | B60N 2/0244 701/49 |
| 2016/0208541 | A1* | 7/2016 | Goto | E05F 15/76 |
| 2018/0022315 | A1 | 1/2018 | Kameyama et al. | |

FOREIGN PATENT DOCUMENTS

| | | | |
|---|---|---|---|
| JP | S62-101548 | A | 5/1987 |
| JP | S62-101574 | A | 5/1987 |
| JP | S63-141842 | A | 6/1988 |
| JP | 2000-280863 | A | 10/2000 |
| JP | 2002-337619 | A | 11/2002 |
| JP | 2008-024034 | A | 2/2008 |
| JP | 2008024034 | A * | 2/2008 |
| JP | 2010-228487 | A | 10/2010 |
| JP | 2016-132889 | A | 7/2016 |

OTHER PUBLICATIONS

Jun. 28, 2018 Office Action issued in German Patent Application No. 10 2017 126 072.2.

* cited by examiner

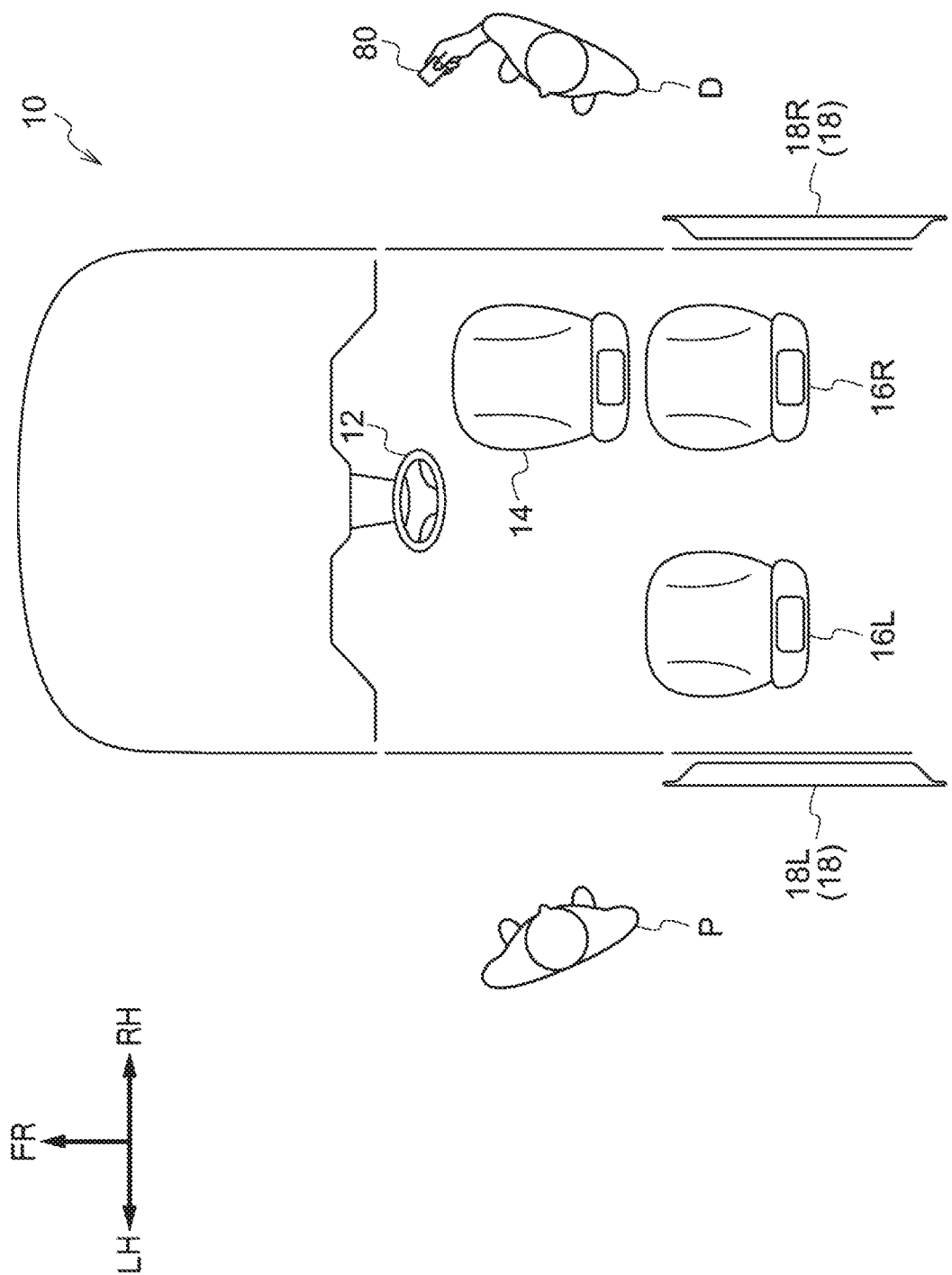

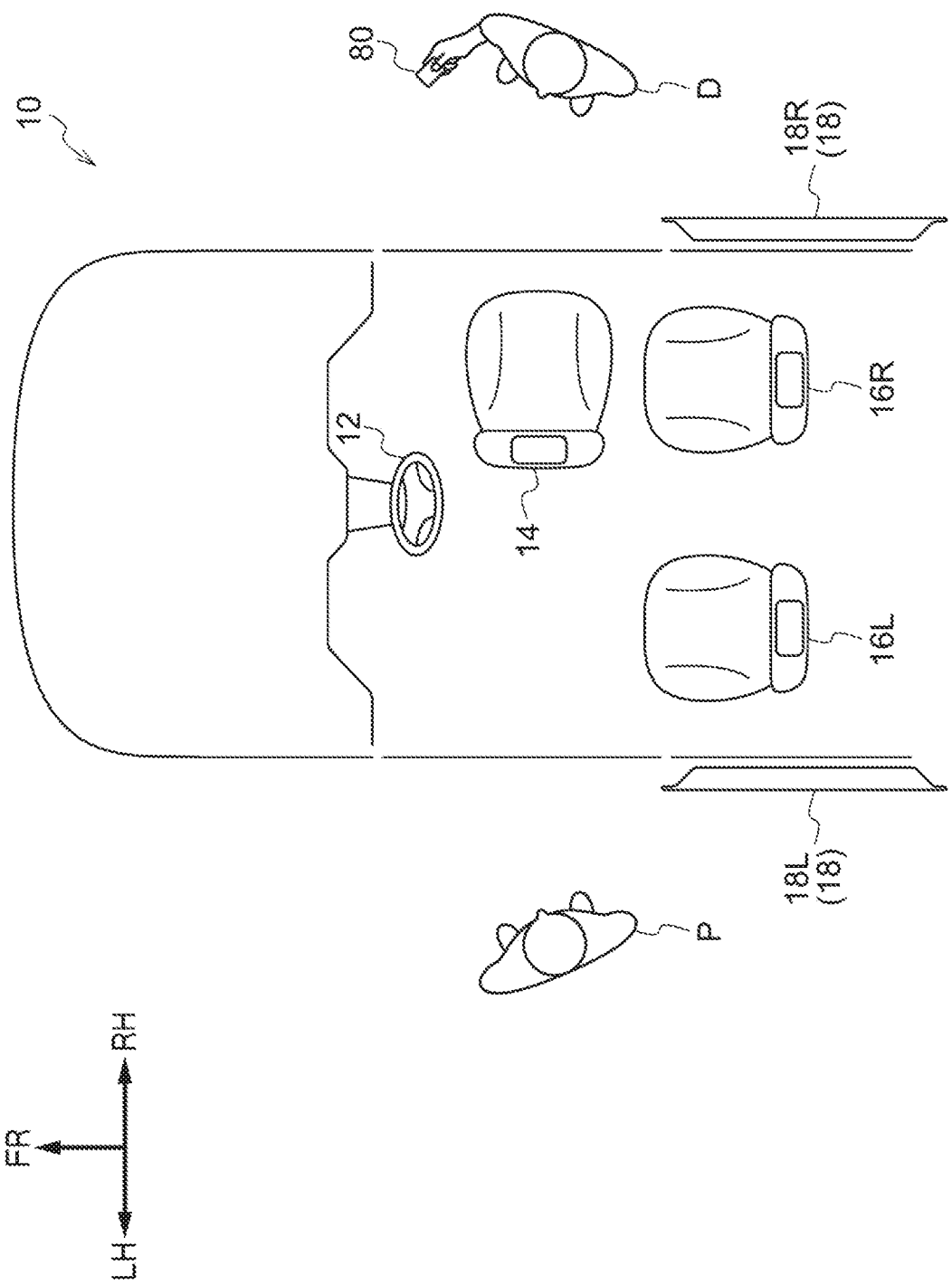

VEHICLE

CROSS-REFERENCE TO RELATED APPLICATION

This application is based on and claims priority under 35 USC 119 from Japanese Patent Application No. 2016-222674 filed on Nov. 15, 2016, the disclosure of which is incorporated by reference herein.

BACKGROUND

Technical Field

The present invention relates to a vehicle.

Related Art

Japanese Patent Application Laid-Open (JP-A) No. S62-101548 discloses a seat for a vehicle in which the seat swivels automatically in correspondence with opening and closing of a door.

In some cases, a driving seat is disposed at a vehicle width direction central portion of a vehicle. In this kind of vehicle, there is concern that ease of boarding is inferior, because the distance from a door to the driving seat is further.

Accordingly, application of the technology mentioned above has been considered. However, the technology mentioned above gives no consideration to a driving seat being disposed at a vehicle width direction central portion and consequently may not be applicable.

SUMMARY

In consideration of the circumstances described above, an object of the present invention is to provide a vehicle that makes sitting onto a driving seat easier in a vehicle in which the driving seat is disposed at a vehicle width direction central portion.

A vehicle according to a first aspect includes: a driving seat on which a driver is to sit; a pair of doors provided at both sides in a vehicle width direction of the driving seat, the doors being configured to open and close; a seat moving mechanism configured to move the driving seat between a driving state and a receiving state, the driving seat in the driving state being positioned at a vehicle width direction center and facing a vehicle front, and the receiving state satisfying at least one condition of: the driving seat being positioned closer to one door of the pair of doors than in the driving state or the driving seat facing further toward the one door of the pair of doors than in the driving state; a detection unit configured to detect a portable device in a detection area in a vicinity of the vehicle and outside a passenger compartment; and a seat control unit that is connected to the detection unit and that controls the seat moving mechanism so as to move the driving seat into the receiving state toward the door of the pair of doors that is at a side at which the portable device is present.

In the vehicle of the first aspect, the seat moving mechanism that is provided is configured to move the driving seat on which the driver is to sit between the driving state and the receiving state. The meaning of the term "driving state" includes the state in which the driving seat is positioned at the center in the vehicle width direction and is facing a vehicle front. The meaning of the term "receiving state" includes a state satisfying one or both of the condition of the driving seat being positioned closer to one of the pair of doors than in the driving state or the condition of the driving seat facing further toward one of the pair of doors than in the driving state.

The vehicle is provided with the detection unit that is configured to detect a portable device in the detection area in a vicinity of the vehicle and outside the passenger compartment, and with the seat control unit that is connected to the detection unit. The seat control unit controls the seat moving mechanism so as to move the driving seat into the receiving state toward the door of the pair of doors that is at the side at which the portable device is present. As a result, the driving seat is moved to the receiving state toward the door of the pair of doors, provided at the two vehicle width direction sides of the driving seat, that is at a side at which a driver carrying the portable device is boarding. Thus, sitting onto the driving seat is made easier.

In the vehicle according to a second aspect, the seat control unit starts control of the seat moving mechanism in a case in which entry of the portable device into the detection area is detected by the detection unit.

In the vehicle of the second aspect, when the entry of a portable device into the detection area is detected by the detection unit, the seat control unit starts control of the seat moving mechanism to move the driving seat into the receiving state toward the door of the pair of doors that is at the side at which the portable device is present. Therefore, the driving seat goes into the receiving state in a case in which a driver is merely acting to board the vehicle, without the driver specifically thinking about the driving seat.

In the vehicle according to a third aspect: the pair of doors are both electric sliding doors; and the seat control unit starts control of the seat moving mechanism in a case in which control is started to open the door of the pair of doors that is at the side at which the portable device is present.

In the vehicle of the third aspect, the seat control unit starts control of the seat moving mechanism at the time at which control is started to open, of the pair of doors that are electric sliding doors, the door at the side at which the portable device is present. Thus, because the door is opened by electric power and the driving seat is moved into the receiving state, ease of boarding into the vehicle for the driver is even further improved.

As described above, the vehicle according to the present invention has an excellent effect in that sitting onto a driving seat is made easier in a vehicle in which the driving seat is positioned at a vehicle width direction central portion.

BRIEF DESCRIPTION OF THE DRAWINGS

Exemplary embodiments of the present invention will be described in detail based on the following figures, wherein:

FIG. 3 is a plan diagram showing a state of the driving seat when a driver is boarding from the right side of the vehicle (a receiving state toward the right), showing a different arrangement from FIG. 2.

FIG. 4 is a plan diagram showing a state of the driving seat when a driver is boarding from the right side of the vehicle (a receiving state toward the right), showing a different arrangement from FIG. 2 and FIG. 3.

DETAILED DESCRIPTION

Figure 1:
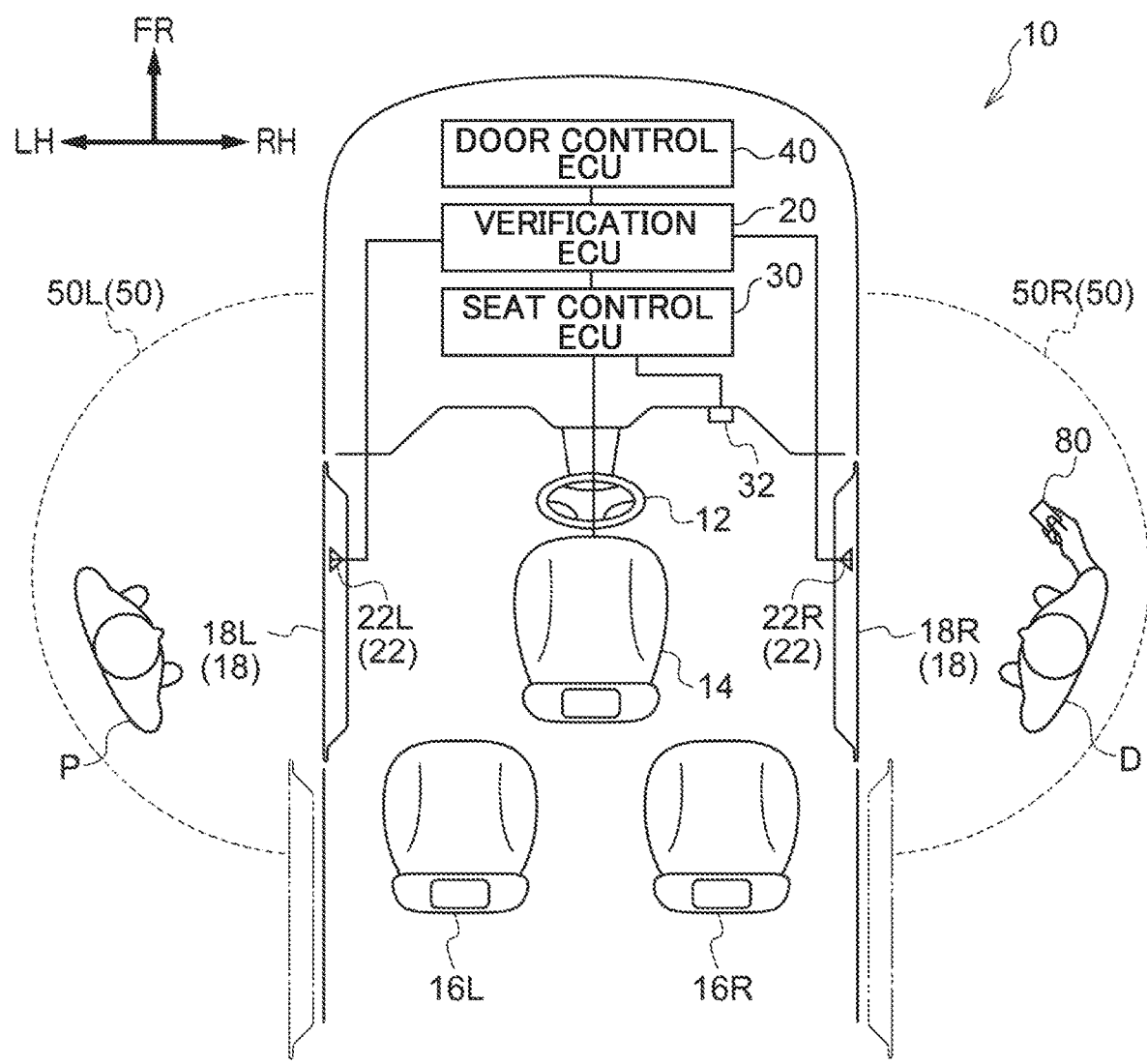
FIG. 1 is a schematic plan diagram showing a vehicle according to a present exemplary embodiment.

Herebelow, a vehicle 10 according to an exemplary embodiment of the present invention is described using the attached drawings.

The arrow FR that is shown where appropriate in the drawings indicates the vehicle front, the arrow LH indicates the vehicle width direction left side, and the arrow RH indicates the vehicle width direction right side. Where the directions front and rear, left and right are referred to below without being particularly specified, these terms refer to the front and rear in the vehicle front-and-rear direction and the left and right in the vehicle width direction.

General Structure of the Vehicle

FIG. 1 shows the vehicle 10 in a schematic plan diagram.

As shown in FIG. 1, a steering wheel 12 is provided in the vehicle 10 at a vehicle width direction central portion.

A driving seat 14 is provided at the vehicle rear of the steering wheel 12. A seat moving mechanism (not shown in the drawings) is provided at the driving seat 14. The seat moving mechanism includes, in addition to a front-and-rear sliding mechanism, a swivelling mechanism and a lateral sliding mechanism. Thus, the driving seat 14 is capable of not just sliding movements in the front-and-rear direction but also swivelling movements and sliding movements in the left-and-right direction. The seat moving mechanism includes seat control actuators, which are not shown in the drawings. Movements of the driving seat 14 are controlled by the seat control actuators being controlled by a seat control electronic control unit (ECU) 30, which is described below. During driving, the driving seat 14 is set in a state in which the driving seat 14 is positioned to be oriented forward at the vehicle width direction central portion (which may below be referred to as "the driving state"). In other situations, movements and states of the driving seat 14 are controlled as required.

A left door 18L and a right door 18R, which serve as a pair of doors, are provided at the left and right sides of a passenger compartment. The left door 18L is provided at the left side of the driving seat 14 and the right door 18R is provided at the right side of the driving seat 14. The left door 18L and right door 18R are both structured as electric sliding doors, opening and closing of which are controlled by a door control ECU 40, described below.

Second row seats 16L and 16R are provided to the rear of the driving seat 14. Two of the second row seats 16L and 16R are provided, separated between left and right. The second row seats 16L and 16R are arranged such that a passenger P boarding through the left door 18L, the right door 18R or the like may easily sit thereon.

The vehicle 10 includes a verification (Electronic Control Unit) ECU 20, which serves as a detection unit, the seat control ECU 30, which serves as a seat control unit, and the door control ECU 40, which serves as a door control unit.

The verification ECU 20 is constituted by a microcomputer including a central processing unit (CPU), a read-only memory (ROM), a random access memory (RAM) and the like. The verification ECU 20 is connected to vehicle exterior antennas 22, including a left antenna 22L and a right antenna 22R.

The left antenna 22L of the vehicle exterior antennas 22 is provided at an outside handle (not shown in the drawings) of the left door 18L. By transmitting request signals, the left antenna 22L forms a left side detection area 50L that spreads to the vehicle outer side from the left door 18L. The right antenna 22R is provided at an outside handle (not shown in the drawings) of the right door 18R. By transmitting request signals, the right antenna 22R forms a right side detection area 50R that spreads to the vehicle outer side from the right door 18R.

An electronic key 80, which serves as a portable device, receives the request signals and transmits response signals including a key identifier. On the basis of the response signals from the electronic key 80 received by the right antenna 22R or the left antenna 22L, the verification ECU 20 detects the presence of the electronic key 80 in the left side detection area 50L or the right side detection area 50R.

The verification ECU 20 is connected with the door control ECU 40 and the seat control ECU 30 via an on-board network such as a controller area network (CAN) or the like. The verification ECU 20 outputs detection results to the door control ECU 40 and the seat control ECU 30.

On the basis of detection results from the verification ECU 20, the door control ECU 40 controls opening and closing of the left door 18L and right door 18R by controlling door control actuators, which are not shown in the drawings.

On the basis of detection results from the verification ECU 20, the seat control ECU 30 controls movements of the driving seat 14 by controlling the unillustrated seat control actuators.

Control Process

An example of control by the door control ECU 40 and control by the seat control ECU 30 is described.

When the verification ECU 20 detects the presence of the electronic key 80 in the right side detection area 50R, the verification ECU 20 outputs a right door opening signal to the door control ECU 40 and outputs a right side receiving signal to the seat control ECU 30.

In accordance with the right door opening signal, the door control ECU 40 performs control to open the right door 18R. In accordance with the right side receiving signal, the seat control ECU 30 performs receiving control toward the right side (see FIG. 2 to FIG. 4).

Alternatively, when the verification ECU 20 detects the presence of the electronic key 80 in the left side detection area 50L, the verification ECU 20 outputs a left door opening signal to the door control ECU 40 and outputs a left side receiving signal to the seat control ECU 30.

In accordance with the left door opening signal, the door control ECU 40 performs control to open the left door 18L. In accordance with the left side receiving signal, the seat control ECU 30 performs receiving control toward the left side (not shown in the drawings).

The meaning of the term "receiving control" as used herein includes control to put the driving seat 14 into a receiving state. In specific terms, receiving control involves controlling the seat moving mechanism so as to move the driving seat 14 into a receiving state toward the door of the left door 18L and the right door 18R that is at the side at which the electronic key 80 is present. The meaning of the term "receiving state" includes states that satisfy at least one of the following conditions: the driving seat 14 being positioned closer to the one door of the pair of doors 18L and 18R than in the driving state; and the driving seat 14 being oriented further toward the one door of the pair of doors 18L and 18R than in the driving state.

Figure 2:
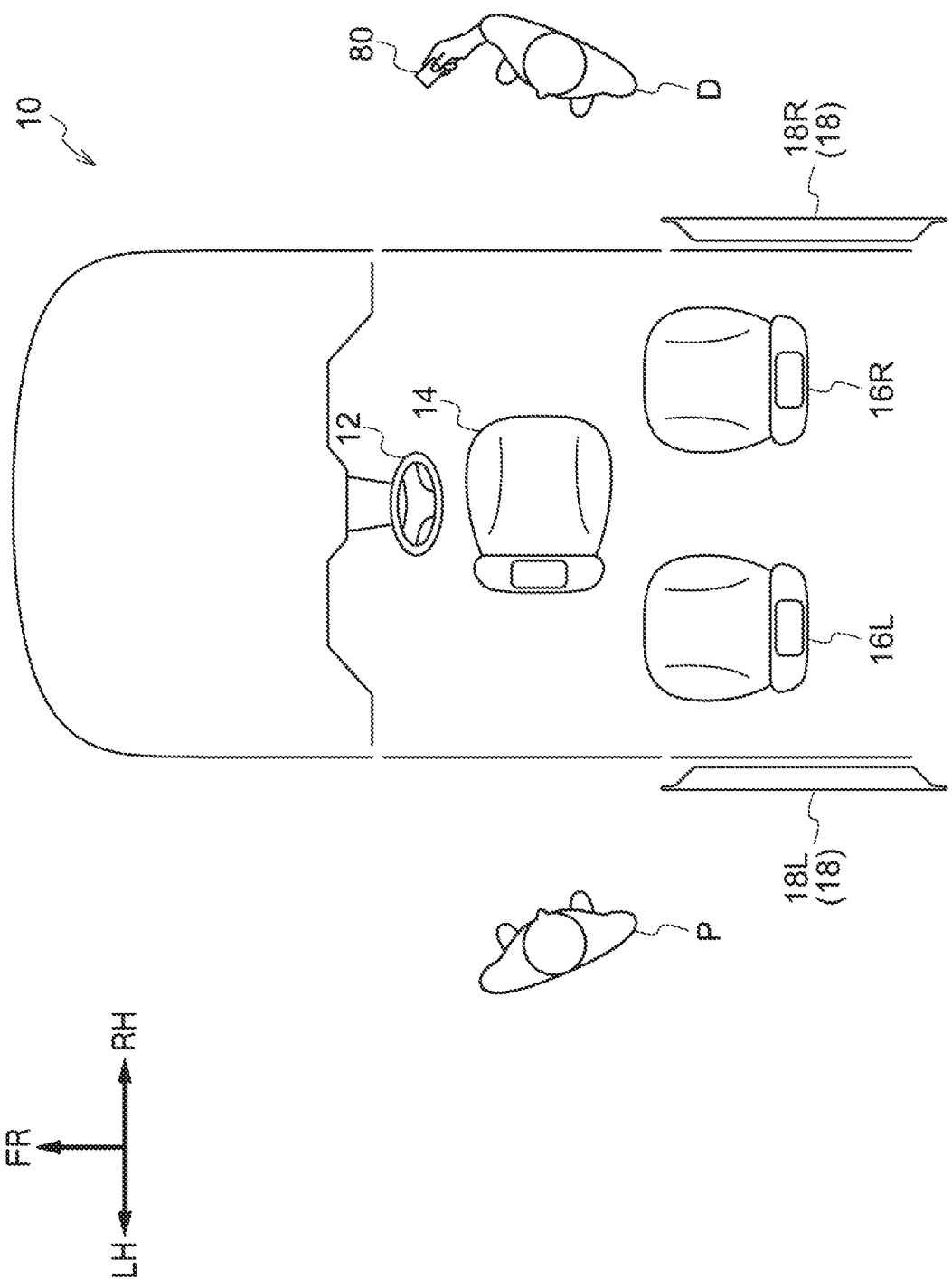
FIG. 2 is a plan diagram showing a state of a driving seat when a driver is boarding from the right side of the vehicle (a receiving state toward the right).

For example, as illustrated in FIG. 2, receiving states (more specifically, receiving states toward the right side) include a state in which the driving seat 14 is positioned at the vehicle width direction central portion and is facing the right door 18R relative to the vehicle front direction. As illustrated in FIG. 3, the receiving states (more specifically, receiving states toward the right side) also include a state in which the driving seat 14 is positioned closer to the right door 18R than the vehicle width direction central portion and is facing the vehicle front direction. As illustrated in FIG. 4, the receiving states (more specifically, receiving states toward the right side) further include a state in which the driving seat 14 is positioned closer to the right door 18R than the vehicle width direction central portion and is facing the right door 18R relative to the vehicle front direction. In FIG. 2 and FIG. 4, states are shown in which the driving seat 14 is facing a direction that is swivelled by 90° to the right from the vehicle front direction, about an axis in the vehicle vertical direction, but receiving states according to the present invention are not limited thus. For example, states in which the driving seat 14 is facing a direction that is swivelled by 30° to the right from the vehicle front direction are included.

As a further example, although not shown in the drawings, the receiving states toward the right side also include a state in which the driving seat 14 is positioned to the vehicle rear side relative to the location at which the driving seat 14 is positioned during driving (the location of the driving seat 14 in the driving state) and is facing a direction that is swivelled by 30° to the right from the vehicle front direction.

A procedure of moving the driving seat 14 from the state shown in FIG. 1 to the receiving state shown in FIG. 4 is not particularly limited. For example, from the state shown in FIG. 1, the driving seat 14 may be swivelled into the state shown in FIG. 2 and then laterally slid into the state shown in FIG. 4, or may be put into the state shown in FIG. 3 and then into the state shown in FIG. 4. As a further example, the driving seat 14 may be put into the state shown in FIG. 4 from the state shown in FIG. 1 by being laterally slid and swivelled at the same time (being swivelled while sliding laterally).

Moreover, a state of the driving seat 14 prior to the receiving control being performed is not limited to the state shown in FIG. 1. That is, the receiving control may be control to change the driving seat 14 from a receiving state toward the left side to a receiving state toward the right side. The receiving control may also be control of the driving seat 14 in a receiving state toward the right side that leaves the driving seat 14 in a receiving state toward the right side.

Operation and Effects

Now, operation and effects of the vehicle 10 according to the present exemplary embodiment are described.

In the vehicle 10 according to the present exemplary embodiment, during driving, the driving seat 14 is positioned at the vehicle width direction central portion (see FIG. 1). Therefore, when a driver D is boarding the vehicle 10, both the left door 18L provided at the left side of the driving seat 14 and the right door 18R provided at the right side of the driving seat 14 can be used at usual times.

Accordingly, when a driver D is carrying the electronic key 80 and is acting as if to board, operations are performed as follows. When the driver D enters a detection area 50 of the surroundings of the vehicle outside the passenger compartment (the right side detection area 50R in FIG. 1), the verification ECU 20 detects the electronic key 80. On the basis of detection results at the verification ECU 20, that is, results indicating that the electronic key 80 is present at the right side of the vehicle 10, the seat control ECU 30 performs control (receiving control) to put the driving seat 14 into the receiving state toward the right side, which is the direction, of the left and right directions, at which the electronic key 80 is present (see FIG. 2 to FIG. 4).

Thus, according to the vehicle 10 according to the present exemplary embodiment, when a driver D is boarding, the driving seat 14 goes into the receiving state toward the direction from which the driver D is boarding. As a result, sitting onto the driving seat 14 is made easier.

In the vehicle 10 according to the present exemplary embodiment, the receiving state of the driving seat 14 that is implemented by the receiving control is the receiving state toward the direction at which the electronic key 80 is present. Therefore, even if a passenger P is using a sub-key and boarding through the door (the left door 18L in FIG. 1) at the opposite side from the door through which the driver D is acting to board (the right door 18R in FIG. 1), the driving seat 14 assuredly goes into the receiving state toward the right side from which the driver D is boarding. Thus, ease of boarding may be suitably improved compared to a technology in which operation of the driving seat 14 simply corresponds with opening of a door.

In the vehicle 10 according to the present exemplary embodiment, the seat control ECU 30 starts the receiving control when the electronic key 80 is detected in the detection area 50 by the verification ECU 20. That is, the receiving control by the seat control ECU 30 starts when (at the moment that) entry of the electronic key 80 into the detection area 50 is detected by the verification ECU 20. Therefore, the driving seat 14 is put into the receiving state when a driver D is merely acting to board the vehicle, without the driver D specifically thinking about the driving seat 14. Thus, convenience is improved.

In the present exemplary embodiment, the door control ECU 40 also starts door opening control when the electronic key 80 in the detection area 50 is detected by the verification ECU 20. That is, both door opening control is started and receiving control of the driving seat 14 is started when the electronic key 80 is detected in the detection area 50 by the verification ECU 20. Therefore, the door 18 at the side from which the driver D is going to board is opened and the driving seat 14 is put into the receiving state toward the side from which the driver is going to board merely by the driver D acting to board, without the driver D specifically thinking about the driving seat 14 and the door 18. As a result, ease of boarding into the vehicle 10 for the driver D is even further improved.

Variant Examples

In the exemplary embodiment described above, an example is described in which the door opening control by the door control ECU 40 and the receiving control by the seat control ECU 30 are started at the moment the electronic key 80 enters the detection area 50. However, the present invention is not limited thus; the timings at which these controls (the door opening control and the receiving control) are started may be modified.

For example, rather than the door opening control and the receiving control starting at the moment the electronic key 80 enters the detection area 50, the door opening control and receiving control may be started at a moment at which a predetermined operation is implemented by the electronic key 80. With this configuration, control that is not desired by a driver D may be prevented.

As another example, rather than the door opening control and the receiving control being started at the moment the electronic key 80 enters the detection area 50, the door opening control and receiving control may be started when, in a state in which the presence of the electronic key 80 in the detection area 50 has been detected, a switch (not shown in the drawings) provided at a door handle of the right door 18R or left door 18L is operated. With this configuration, control when the driver D is close to the vehicle 10 but does not intend to board may be prevented, but ease of boarding when the driver D does intend to board may be appropriately improved.

In the exemplary embodiment described above, an example is described in which the door opening control and the receiving control are started at substantially the same time (the moment at which entry of the electronic key 80 into the detection area 50 is detected by the verification ECU 20), but the present invention is not limited thus. The timing of the start of door opening control and the timing of the start of receiving control may be different.

For example, the receiving control may be started at the moment the electronic key 80 enters the detection area 50 whereas the door opening control may be started when a switch provided at a door handle is operated in the state in which the electronic key 80 has been detected in the detection area 50. With this configuration, the movement of the driving seat 14 by the receiving control is started before the start of door opening. Thus, it is easy to put the driving seat 14 into the receiving state before the door is opened up. Accordingly, movements of the driving seat 14 may be slower movements that give a sense of luxury. Moreover, unnecessary opening of the door may be prevented.

In the vehicle 10 according to the present exemplary embodiment, as illustrated in FIG. 1, a selector switch 32 may be provided inside the passenger compartment. When the selector switch 32 is switched off, the seat control ECU 30 does not perform the receiving control. Further, the start timing of the door opening control and the start timing of the receiving control may be selected from a range of combinations as described above by operation of the selector switch 32.

In the exemplary embodiment described above, an example is described in which the left door 18L and the right door 18R are both electric sliding doors, opening and closing of which are controlled by the door control ECU 40, but the present invention is not limited thus. The left door and right door may be sliding doors that are not driven by electric power and the vehicle need not be equipped with a door control ECU, or the left door and right door may be hinged doors.

What is claimed is:

1. A vehicle comprising:
    a driving seat;
    a pair of doors, wherein a first door of the pair of doors is provided at a first side of the driving seat in a vehicle lateral width direction, wherein a second door of the pair of doors provided at a second side of the driving seat in the vehicle lateral width direction, and wherein each of the first and second doors are configured to open and close;
    a seat moving mechanism provided in the driving seat and configured to move slidably and rotate the driving seat between a driving state and a receiving state, wherein, in the driving state, the driving seat is positioned at a center position bisecting a lateral width of the vehicle and facing the front of the vehicle, and wherein the receiving state is a state whereby the driving seat is positioned closer to and facing one door of the pair of doors than in the driving state;
    a first processor configured to operate as a detection unit configured to detect a first portable device and a second portable device in a detection area, the detection area being both in a vicinity of the vehicle and outside of a passenger compartment of the vehicle; and
    a second processor configured to operate as a seat control unit, the second processor being communicatively connected to the first processor, the seat control unit controlling the seat moving mechanism so as to move slidably and rotate the driving seat from the center position into the receiving state at a first location toward a door of the pair of doors, the seat control unit not controlling the seat moving mechanism based on a second location, the first location being chosen based upon which side the portable device is detected by the detection unit to be present at, the second location being chosen based upon which side the second portable device is detected by the detection unit to be present at; and
    a third processor configured to operate as a door control unit, the third processor being communicatively connected to the first processor, the door control unit opening and closing the first door and the second door located at the identified corresponding first location and second location, respectively,
    wherein when the first portable device is at a location closer to the first door than to the second door, the first location is a location toward the first door of the pair of doors, and when the portable device is at a location closer to the second door than to the first door, the first location is a location toward the second door of the pair of doors, and
    wherein when the second portable device is at a location closer to the first door than to the second door, the second location is a location toward the first door of the pair of doors, and when the second portable device is at a location closer to the second door than to the first door, the second location is a location toward the second door of the pair of doors.

2. The vehicle according to claim 1, wherein the seat control unit starts control of the seat moving mechanism in a case in which entry of the portable device into the detection area is detected by the detection unit.

3. The vehicle according to claim 1, wherein:
    each door of the pair of doors are electric sliding doors; and
    the seat control unit starts control of the seat moving mechanism in a case in which control is started to open the door of the pair of doors that is at the side at which the portable device is present.

4. The vehicle according to claim 1, wherein the seat control unit starts control of the seat moving mechanism in a case in which, in a state in which entry of the portable device into the detection area is detected by the detection unit, a predetermined operation is implemented by the portable device or operation of a switch provided at a door handle of the door of the pair of doors that is at the side at which the portable device is present occurs.

5. The vehicle according to claim 1, wherein:
    each door of the pair of doors are electric sliding doors; and
    the seat control unit starts control of the seat moving mechanism in a case in which entry of the portable device into the detection area is detected by the detection unit,
    control is started to open the door of the pair of doors that is at the side at which the portable device is present in a case in which, in a state in which entry of the portable device into the detection area is detected by the detection unit, a predetermined operation is implemented by the portable device or operation of a switch provided at a door handle of the door of the pair of doors that is at the side at which the portable device is present occurs.

* * * * *